United States Patent [19]

Brauer et al.

[11] Patent Number: 5,158,362
[45] Date of Patent: Oct. 27, 1992

[54] METHOD FOR MEASURING THE MASS OF LIQUID IN A STORAGE TANK

[75] Inventors: Laura E. Brauer, Lawrence Township, Mercer County, N.J.; Siu H. Chun, Langhorne, Pa.; Keith Davies, Robbinsville; Joseph A. Pulkowski, East Amwell Township, Hunterdon County, both of N.J.

[73] Assignee: General Electric Company, East Windsor, N.J.

[21] Appl. No.: 663,487

[22] Filed: Feb. 8, 1991

[51] Int. Cl.⁵ .................... G01K 17/00; G01K 1/16
[52] U.S. Cl. ......................... 374/33; 73/167; 244/159; 374/29; 374/43
[58] Field of Search ............ 374/54, 33, 41, 43, 374/45; 73/149, 295, 292; 244/159

[56] References Cited

U.S. PATENT DOCUMENTS

| | | | |
|---|---|---|---|
| 4,299,126 | 11/1981 | Heuwieser et al. | 73/295 |
| 4,726,224 | 2/1988 | D'Ausilio | 73/167 |
| 4,916,715 | 4/1990 | Adiutori | 374/1 X |
| 4,984,457 | 1/1991 | Morris | 73/149 |
| 4,987,775 | 1/1991 | Chobotov . | |
| 5,044,764 | 9/1991 | Aoki et al. | 374/54 X |

*Primary Examiner*—Daniel M. Yasich
*Attorney, Agent, or Firm*—William H. Meise; Stephen A. Young; Clement A. Berard

[57] ABSTRACT

The unknown amount or mass of liquid contained in a storage tank is measured by calibrating the tank in an empty and partially full condition. The calibration includes measuring the mass of the empty tank, and is accomplished by applying a measured amount of heater power or energy to the tank and its contents, and measuring the temperature response to determine the product of total mass multiplied by specific heat. The specific heat depends upon the mass or amount of liquid in the tank, but a linear relationship is established between total mass and the product of total mass times specific heat. The unknown mass of liquid is then determined by applying a known amount of heater power or energy to the tank and its contents, and measuring the temperature rise or rate of rise in response thereto. The mass of the system multiplied by specific heat is determined from the temperature rise or rate of rise, and is interpolated or extrapolated relative to the calibration to determine the mass of the system with its unknown amount of liquid. The mass of the tank is subtracted from the unknown system mass to determine the mass of the liquid. In a spacecraft fuel tank application, the tank-empty calibration is performed in an evacuated test chamber, and the partially-full calibration is performed on-orbit after one thruster burn has consumed an amount of fuel which is determined from a schedule based upon knowledge of the consumption of the particular thrusters or types of thrusters being used.

13 Claims, 4 Drawing Sheets

METHOD FOR MEASURING THE MASS OF LIQUID IN A STORAGE TANK

BACKGROUND OF THE INVENTION

This invention relates to techniques for measuring the mass of liquid in a storage tank, and more particularly to a method and apparatus for measuring the amount of liquid fuel in the fuel storage tanks of a spacecraft.

In many situations, it is necessary to be able to accurately gauge the amount of liquid remaining in a storage tank. When an undesirable event accompanies the exhaustion of the liquid, it is particularly important to be able to estimate the remaining liquid accurately.

One example of where all the foregoing exist is in a satellite attitude control system employing gas jets or thrusters. Gas for the jets or fuel for the thrusters is usually stored in liquid form in containers or tanks on the satellite. When the gas or fuel is used up, most satellites become inoperative, or at least suffer significantly degraded capability. Moreover, without gravity to pool the liquid in the tank it tends to distribute itself in response to other forces. Fuel is generally used herein to denote the fluid contents of the container, whether or not the liquid would strictly be considered fuel.

The length of time that a particular load of fuel will provide stationkeeping for a satellite cannot be predicted exactly, because it depends upon environmental conditions, such as solar wind pressure and magnetic fluctuations, and also on thruster performance. Furthermore, the exact amount of fuel used during each maneuver also depends upon the exact characteristics of controllers, which may vary slightly with time and environment. Thus, the exact amount of fuel remaining in a spacecraft becomes less well known as time progresses, unless a suitable measurement scheme is used.

At the end of life of a geostationary satellite, for example, the remaining fuel is used to remove it from its assigned orbital position so that a replacement satellite may be inserted into that orbital position. So long as the old satellite is given enough velocity to vacate the regions of interest, it is irrelevant how much additional velocity it is given. If the amount of fuel remaining in the tanks at the time the satellite is ejected from its orbital position exceeds that necessary to send the satellite to the graveyard of old satellites, the excess fuel could have been used for additional useful time in orbit. Because the amount of fuel required for stationkeeping is very small, months of potential stationkeeping time could be wasted if the ejection from orbital position occurs too early. On the other hand, if the decision is made too late, there may be insufficient fuel to cause the satellite to be removed from its orbital position, and the orbital position it occupies may not be usable for a replacement satellite. As a practical matter, the customer specifying the satellite to be manufactured may contractually require that a predetermined life be achieved.

Communication satellite weight is tightly controlled in order to provide the largest possible load of fuel for stationkeeping, thereby obtaining the longest possible useful life. For a satellite with 24 transponders which are polarization-multiplexed to provide 48 effective communication channels, the value of additional usable fuel may be several million dollars per additional month of useful life.

Thus, it is very advantageous to be able to determine the amount of remaining fuel. The measurement, however, is rendered complex because under weightless conditions, the fuel spreads through the tank. In order to prevent the fuel from forming into balls spread throughout the tank, the tanks include one or more thin circumferential bands near the inner surface of the tank. These bands capture the central bubble which tends to form, holding the remaining fuel against the outer walls and the bands.

A technique for using lightweight open electromagnetic transmission lines associated with the circumferential bands is described in U.S. patent application Ser. No. 07/285,699, filed Dec. 16, 1988 in the name of Hubert et al. That scheme requires the ability to apply electromagnetic signals to the interior of the fuel tank of the spacecraft, which undesirably may require one or more electrically insulated connections through the side of the fuel tank. An improved method and apparatus for gauging the amount of liquid or fuel in a storage tank is desired.

SUMMARY OF THE INVENTION

A method for the measurement of the mass of a liquid or fluid in a storage tank is described. The temperature rise of an empty storage tank is measured in response to the application of a known amount of heat energy, to establish the product of the mass multiplied by the specific heat of the empty tank(s) and items thermally associated therewith. In a particular embodiment using a spacecraft, this first calibration is performed on the propellant storage tank(s) (or possibly a simulation thereof) in an evacuated chamber, simulating an on-orbit environment, before launch of the spacecraft. In the spacecraft embodiment, a measured mass of fuel is loaded into the tank(s), and the spacecraft is launched into orbit. A second calibration is then performed. In a particular version of the method, the second calibration is performed after orbit is achieved and telemetry is established. In a yet further version of the method, the second calibration is performed after a fuel burn. The mass of fuel consumed by the burn is known to within a small error. In all embodiments, the second calibration is performed by applying a second known amount of heat energy desirably equal to the amount applied in first calibration to the tank with a known mass of liquid therein, and the product is formed of the mass of the system (the tank plus the liquid) multiplied by the specific heat of the system. These two calibrations establish a linear relationship which may be used to gauge the amount of liquid in the storage tank. An unknown amount of liquid is gauged at a later time by applying a measured amount of heat energy (desirably an amount equal to that used in previous calibrations) to the tank-plus-liquid system, and measuring the temperature rise, to determine the product of the unknown total mass multiplied by the unknown specific heat of the system. Comparison of the value of the product with the linear relationship previously established unambiguously identifies the total mass of the tank-plus-liquid. The known mass of the tank is subtracted to yield the unknown mass of the liquid.

DESCRIPTION OF THE INVENTION

Figure 1:
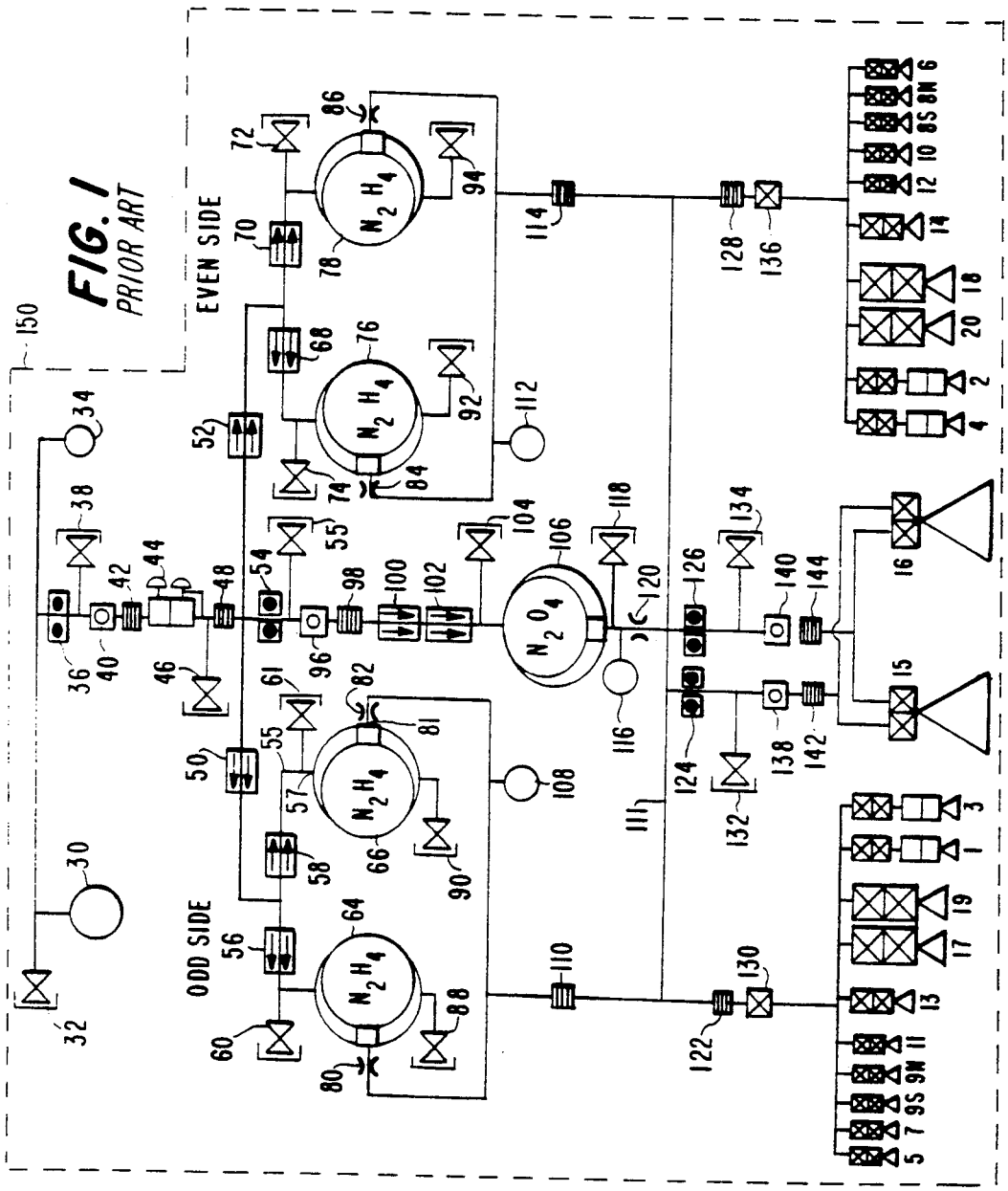
FIG. 1 is a simplified block diagram of the fuel system of a prior art spacecraft.

FIG. 1 is a simplified block diagram of the fuel system of a spacecraft 150, as described in copending patent application Ser. No. 07/285,699 filed Dec. 16, 1988 in the name of Hubert et al. In FIG. 1, fuel storage tanks 64, 66, 76 and 78 may be loaded with hydrazine ($N_2H_4$) fuel, which is pressurized by helium supplied from a tank 30. An oxidizer tank 106 is also pressurized with helium from tanks 30. Fuel from tanks 64, 66, 76 and 78 is provided in a controlled fashion to any of monopropellant engines (jets or thrusters) 1 through 14 and 18 through 20, and to bipropellant engines 15 and 16. Thus, all engines use the same fuel. Oxidizer is supplied in a controlled fashion from tank 106 to bipropellant engines 15 and 16. Engines 1 through 20 are used for moving the spacecraft from transfer orbit to the final orbit, and/or for North-South stationkeeping and attitude control.

The pressure in tank 30 is monitored by a pressure transducer 34. A service valve 32 provides access for loading tank 30 with helium. The helium in tank 30 is prevented from flowing to the fuel or oxidizer tanks during the boost of the spacecraft to low earth orbit by dual or redundant, normally-closed pyrotechnic valves 36. After release from the booster, pyrotechnic valves 36 are fired to allow pressurization of the fuel and oxidizer tanks. A further service valve 38 allows testing of the system with valve 36 installed. A normally-open pyrotechnic valve is connected to a helium filter 42. Helium flowing from tank 30 through valves 36 and 40 and through filter 42 then passes through a dual redundant pressure regulator arrangement 44 and through a further filter 48. Service valve 46 provides additional access. From filter 48, the helium divides into three paths, flowing through dual redundant check valves 50 and 52 toward the fuel tanks, and through a path including a dual redundant normally-closed pyrotechnic valve 54. Helium flowing through check valve 50 flows through additional redundant check valves 56 and 58 to tanks 64 and 66, respectively. Service valves 60 and 88 are associated with tank 64, and service valves 62 and 90 are associated with tank 66. Similarly, helium flowing through check valve 52 flows through additional check valves 68, 70 to fuel tanks 76 and 78, respectively. Service valves 74 and 92 are associated with fuel tank 76, and service valves 72 and 94 are associated with fuel tank 78. Fuel can flow from tanks 64, 66, 76 and 78 by way of orifices 80, 82, 84 and 86, respectively, when there is a demand. Orifices 80 and 82 are connected together, and may be monitored by a pressure transducer 108. Similarly, orifices 84 and 86 are connected together and the fuel pressure may be monitored by a transducer 112. The fuel flowing from tanks 64 and 66 flows through a filter 110 and to a common fuel line 111.

Fuel from tanks 76 and 78 flows through a filter 114 and to common fuel line 111. From fuel line 111, fuel is available to all engines.

When pyrotechnic valve 54 is fired, the valve opens to allow helium gas to flow past service valve 55 through a normally-open pyrotechnic valve 96, through a filter 98, through check valves 100 and 102 and past a service valve 104 to pressurize oxidizer tank 106. A pressure transducer 116 allows monitoring of the pressure in the tank, and service valve 118 provides access for filling or draining when appropriate. When there is demand for oxidizer, oxidizer exits tank 106 via an orifice 120. A further normally-closed pyrotechnic valve 126 prevents premature flow of oxidizer. When fired, valve 126 allows oxidizer to flow past a service valve 134 and a normally-open pyrotechnic valve 140 through a filter 144 to the control valves of bipropellant apogee engines 15 and 16.

A normally closed pyrotechnic valve 124 is fired after the booster has inserted the spacecraft into a low earth orbit, allowing fuel to flow from any of tanks 64, 66, 76 and 78 past a service valve 132 and through a normally open pyrotechnic valve 138 and a filter 142 to the fuel control valves of engines 15 and 16.

Fuel may also flow from common fuel line 111 through filters 122 and 128 to latch valves 130 and 136, which control fuel flow to engines 1 through 14 and 18 through 20, which are individually controllable.

Figure 2:
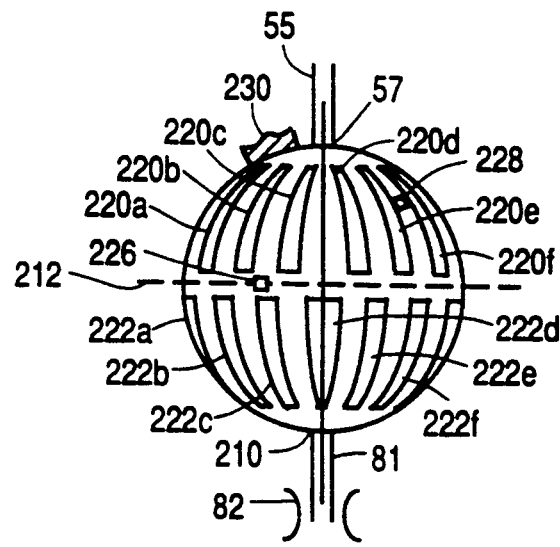
FIG. 2 illustrates details of a fuel tank of the system of FIG. 1, illustrating heaters and thermal sensing devices according to the invention.

FIG. 2 is a simplified representation of the exterior of fuel tank 66 of FIG. 1. As illustrated in FIG. 2, fuel tank 66 is generally spherical, with inlet pipe 55 connecting to the tank at an inlet location 57 diametrically opposed to the position of liquid outlet 210. A dash-line 212 represents an edge view of a plane passing through the "equator" of the spherical tank. The "equator" girdles tank 66 at a location midway between the "poles," which are the locations of pressurizing inlet 57 and liquid outlet 210. Spherical tank 66 is supported to the body 10 of the spacecraft by support means.

As is well known in the art, heaters are associated with each fuel tank to maintain the fuel temperature. In FIG. 2, two sets 220a-1 and 222a-1, each of twelve electrical strip heaters, for a total of 24 strip heaters, are associated with tank 66. Not all the heaters are visible in the view of FIG. 2, some of the heaters being on the hidden side of the tank. The other tanks of FIG. 1 are similarly provided with heaters. As illustrated in FIG. 2, the heaters are affixed to the exterior of fuel tank 66, with their axes of elongation following great-circle lines (not illustrated) extending from pole to pole, i.e. from inlet 57 to outlet 210. Each set of twelve heaters is associated with one hemisphere. In particular, heaters 220 are associated with the upper hemisphere, and heaters 222 are associated with the lower hemisphere. As illustrated in FIG. 2, each strip heater, as for example heater 220c in the "upper" hemisphere, and heater 222d in the "lower" hemisphere, is tapered in width, being wider near the equator defined by plane 52, and narrower near the poles. Such a configuration contributes to even heating of the surface of the tank. Each strip heater is associated with a set of electrical power conductors (not illustrated in FIG. 2), by which electrical power can be applied to the heater.

According to an aspect of the invention, temperature sensors are placed on the outer surface of storage tank 66 at a location on the equator, and in the upper and lower hemispheres at diametrically opposite locations, for reasons described below. In FIG. 2, a first temperature measuring thermocouple 226 is located on the equator of tank 66, another thermocouple 228 is located approximately half-way between the equator and inlet 57 on the upper hemisphere, and another thermocouple is located diametrically opposite thermocouple 228, on the hidden side of the lower hemisphere of spherical tank 66. These are the locations for a minimal number of temperature measuring devices which together have been found to reliably yield sufficient information to determine the temperature of the tank.

As is well known in the art, the fuel, oxidizer or other liquid storage tanks of a spacecraft may be surrounded by a thermal control or insulating blanket, a cross-sectional portion of which is illustrated in FIG. 2 as 230.

Figure 3:
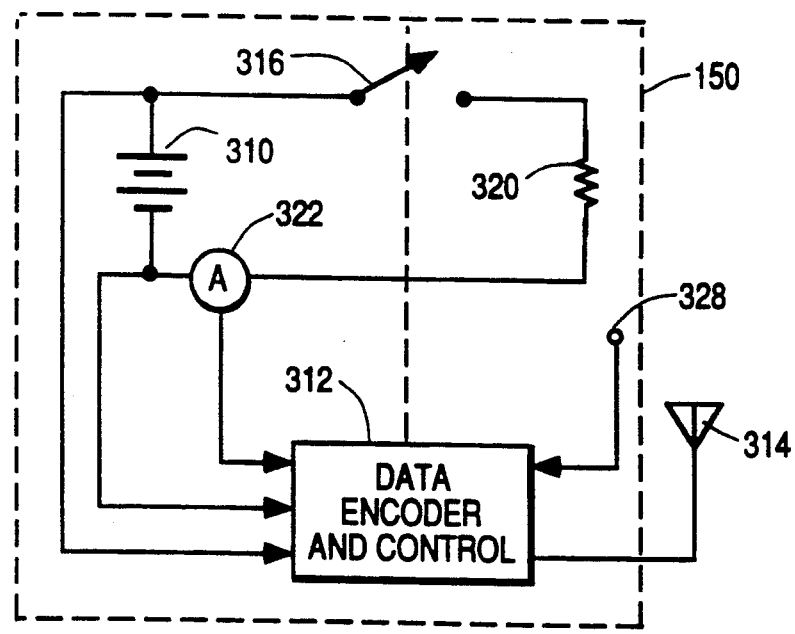
FIG. 3 is a simplified diagram in block and schematic form illustrating certain electrical connections of heaters and thermocouples associated with a storage tank, in accordance with the invention.

FIG. 3 is a simplified schematic diagram of the telemetry reporting and control system of satellite 150. In FIG. 3, the spacecraft electrical power source is illustrated as a battery 310, which supplies voltage to a data encoder and control system illustrated as a block 312. The battery voltage is sampled and encoded in block 312, and may be telemetered by way of an antenna 314 to a ground station for monitoring. Battery 310 is connected by way of a controllable switch or relay 316 across the series connection of resistive heater 320 and a current-sensing device 322. Current-sensing device 322 is connected to block 312, and supplies current-representative signals thereto for encoding. Current-sensing device 322 may be a simple shunt, well known in the art. Resistive heater 320 may represent the interconnection of all heaters 220 and 222 of FIG. 2. Such an interconnection has the advantage that the power (the time rate of energy) flow to the heaters may be determined by only one voltage measurement in conjunction with one current measurement. Those skilled in the art understand that heaters 220a-1 and 222a-1 may be individually switched in and out of circuit to vary the amount of total heater power in a stepwise manner. A thermocouple or other temperature measuring device 328, corresponding to one or all of thermocouples 226, 228 of FIG. 2, is also illustrated as being connected to data encoding and control block 312. Data encoder and command block 312 of FIG. 3 also receives telemetry commands for opening and closing switch 316 (and other switches, not illustrated), and for encoding and transmitting voltage, current, and temperature measurements. Data encoder and command block 312 of FIG. 3 also receives telemetry commands for opening and closing switch 316 (and other switches, not illustrated), and for encoding and transmitting voltage, current, and temperature measurements. It should be noted that the several thermocouples used for measuring temperature are not normally paralleled, but are individually connected for measurement. The temperature values read therefrom may advantageously be averaged. Hereinafter, average temperatures are assumed.

As so far described, the structure of the spacecraft is substantially in accordance with the prior art except for the presence of the ammeter for measuring heater current, which is not normally of interest, and also except for the locations of the temperature sensors on the liquid storage tanks.

In accordance with an aspect of the invention, electrical energy or power is applied to the heaters of a tank as a step in a method for determining the amount of liquid (fuel or oxidizer, or more generally any liquid or fluid) in the tank. The method generally includes steps of applying heat energy to the tank, and measuring the temperature rise in response to the heat energy. These steps are performed for calibration with different amounts of liquid in the storage tank. An advantageous method uses only two calibration measurements, a first with zero liquid in the tank, and the second with a known amount of liquid in the tank. Typical supports for a spacecraft fuel tank do not have large heat conductivity. To the extent that the conduction of heat affects the measurements, the effect is compensated by not changing from measurement to measurement. The insulating blanket prevents excessive heat loss from the surface of the tank.

For simplicity, a discussion of a method according to the invention is made as if the spacecraft includes only one storage tank. The tank system of the spacecraft, including the tank and its supporting arrangement, the thermal equipment, and liquid propellant and the helium ullage bubble, has a characteristic specific heat $C_p$, corresponding to the weighted ratio of each of the constituent members of the system. Because the tank and thermal equipment masses are invariant with time, and the helium mass is insignificant, the specific heat of the tank system is directly related to the propellant mass.

The method for measuring the mass of liquid generally determines the propellant mass and corresponding $C_p$ of a tank system by measuring the temperature increase resulting from the application of a known amount of heat to the tank. The basis for this method is the energy equation:

$$Q\Delta t = mC_p \Delta T \qquad (1)$$

where,
$Q$ = Applied heat rate minus heat loss rate to the environment (J/s),
$\Delta t$ = Change in time (s),
$m$ = Mass of the tank system (kg),
$C_p$ = Specific Heat of the tank system (J/kg-°K.),
$\Delta T$ = Change in temperature (°K).

The specific heat of the tank system is dependent upon the amount of fluid in the tank, $$mC_p)_{system} = m_1 C_{p1} + m_2 C_{p2} + m_3 C_{p3} + \qquad (2)$$

where the subscripts denote constituent elements of a system. For a tank system, equation (2) becomes:

$$mC_p)_{system} = mC_p)_{tank} + mC_p)_{He} + mC_p)_{propellant} \qquad (3)$$

This relation can be substituted into the energy equation to yield the mass of the propellant as a function of heat input, time, change in temperature, the mass of the tank and helium ullage bubble, and a calibrated specific heat for the tank system.

$$Q\Delta t = mC_p)_{system} \Delta T \qquad (4)$$

where $mC_p)_{system}$ depends upon the amount of liquid in the tank. Rearranging equation (4), $$\frac{Q\Delta t}{mC_p)_{system}} = \Delta T \qquad (5)$$

Equation 5 shows that for application of a given amount of energy $Q\Delta t$, the temperature rise $\Delta T$ depends upon the magnitude of the denominator $mC_p)_{system}$, or in other words $\Delta T$ depends upon the mass $m$ of the tank system and its specific heat $C_p)_{system}$.

This shows that applied energy $Q\Delta t$ is related to temperature rise $\Delta T$ by the slope $mC_p)_{system}$. Therefore, a plot of temperature rise $\Delta T$, in response to applied energy, will be a straight line and the slope of the line will depend upon the amount of liquid in the tank.

In general, the unknown mass $m_3$ of the liquid can be expressed in terms of measurements made on the tank with the unknown amount of liquid and calibration measurements. Equation (4) can be rearranged as $$\frac{Q_1 \Delta t_1}{\Delta T_1} = m_1 C_{p1} \tag{6}$$

where the subscript 1 indicates a first calibration measurement on an empty storage tank, so that $m_1$ equals the mass of the storage tank plus associated thermal equipment. It is important to note that the product $(m_1 C_{p1})$ is measured directly by measuring the energy $Q\Delta t$ and the temperature rise $\Delta T$. The same general form of the equation is used for the second calibration with a known mass of liquid, where the specific heat, $C_{p2}$, reflects the mass weighted contributions to the system specific heat of the tank and liquid $$\frac{Q_2 \Delta t_2}{\Delta T_2} = m_1 C_{p1} + m_2 C_{pf} = m_t C_{pt} \tag{7}$$

where $m_2 C_{pf}$ is the mass of tank plus fuel multiplied by the specific heat of tank plus fuel in the second calibration, the subscript f represents fuel, and subscript t means total.

A similar equation represents the third measurement, with an unknown amount of liquid in the tank $$\frac{Q_3 \Delta t_3}{\Delta T_3} = m_1 C_{p1} + m_3 C_{pf} = m_t C_{pt} \tag{8}$$

Subtracting equation (6) from equations (7) and (8) isolates the fuel masses $m_2$ and $m_3$ from tank mass $m_1$ to yield the following relationships $$\frac{Q_2 \Delta t_2}{\Delta T_2} - \frac{Q_1 \Delta t_1}{\Delta T_1} = m_2 C_{pf} \tag{9}$$

$$\frac{Q_3 \Delta t_3}{\Delta T_3} - \frac{Q_1 \Delta t_1}{\Delta T_2} = m_3 C_{pf} \tag{10}$$

Equation (9) is solved for $C_{pf}$ $$C_{pf} = \frac{\frac{Q_2 \Delta t_2}{\Delta T_2} - \frac{Q_1 \Delta t_1}{\Delta T_1}}{m_2} \tag{11}$$

Equation (11) is substituted for $C_{pf}$ in equation (10) to form $$m_3 = \frac{\left(\frac{Q_3 \Delta t_3}{\Delta T_3} - \frac{Q_1 \Delta t_1}{\Delta T_1}\right) \times m_2}{\left(\frac{Q_2 \Delta t_2}{\Delta T_2} - \frac{Q_1 \Delta t_1}{\Delta T_1}\right)} \tag{12}$$

Finally, equations (6), (7) and (8) are substituted into equation (12) to form the desired general result $$m_3 = \frac{m_2(m_3 C_{p3} - m_1 C_{p1})}{(m_2 C_{p1} - m_1 C_{p1})} \tag{13}$$

so that $m_3$ can be determined solely from measured values.

In a test, a 12-inch diameter spherical stainless-steel tank was equipped with heaters, thermocouples and blankets generally as illustrated in FIG. 2, although a total of 28 thermocouples were used to verify temperature distribution. The tank, with a total mass of 4.15 kg, was placed in thermal isolation in a vacuum chamber that was evacuated to less than 100 mTorr. Once the temperature in the chamber stabilized, for these tests at about 20° C., the heaters were turned on by applying 60 volts DC to a 420 ohm heater resistance, corresponding to 8.57 watts of electrical power. It was discovered that changes in heater resistance with temperature made the determination of applied power somewhat inaccurate, so an ammeter was used to measure the current. The applied power is the product of applied voltage multiplied by heater current, and the applied energy is the applied power multiplied by the time of application.

Figure 4:
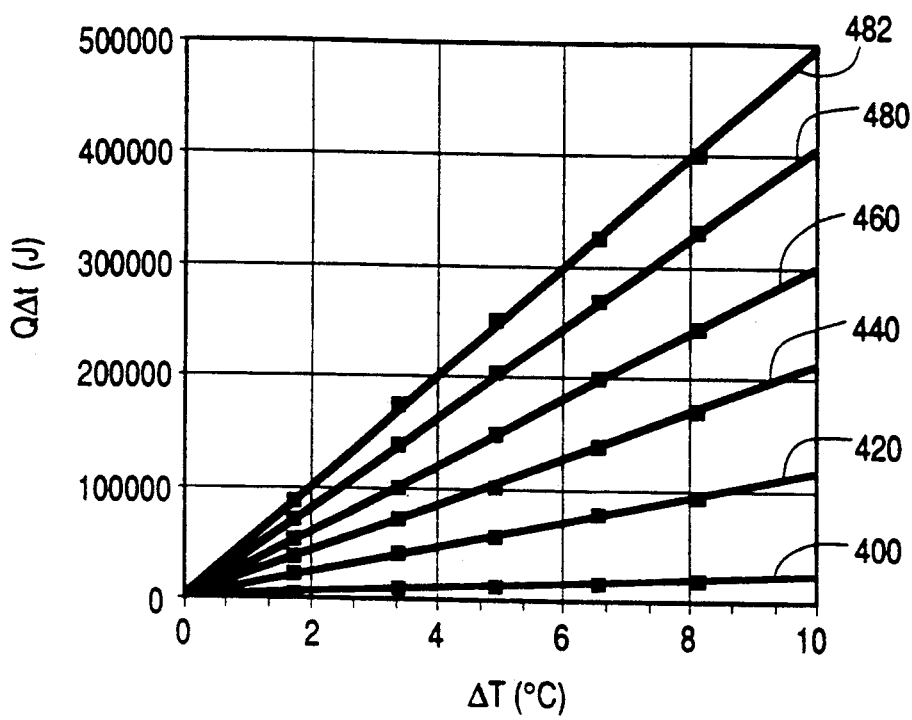
FIG. 4 plots temperature rise versus heat energy for liquid storage tanks under various conditions of ullage to provide indications of mass times specific heat ($mC_p$)
Figure 5:
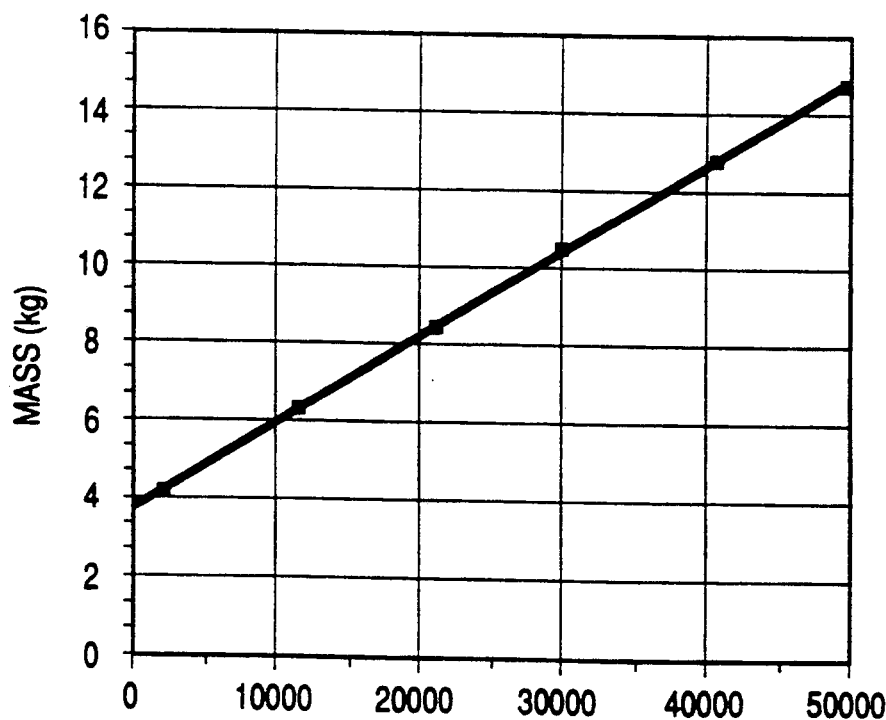
FIG. 5 plots the slope of the plots $mC_p$ of FIG. 4 versus total mass.
Figure 6:
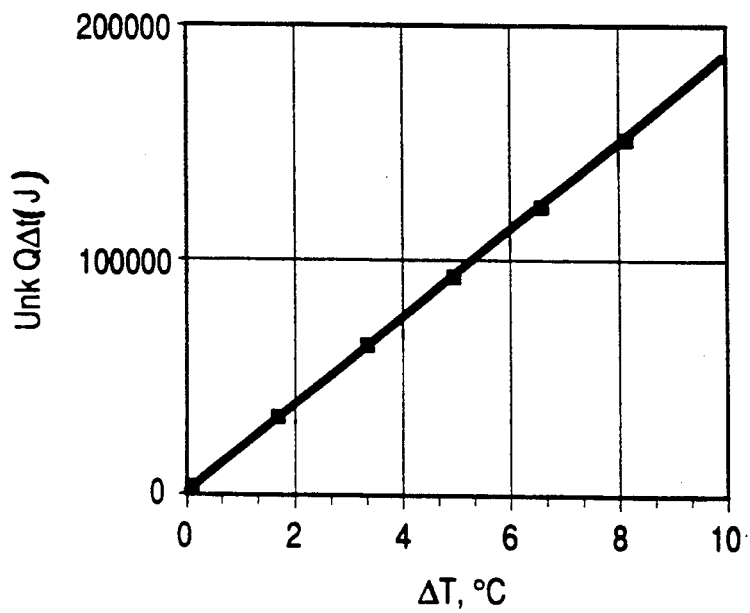
FIG. 6 is a plot similar to that of FIG. 4 for a specific test.

The temperature of the thermocouples was recorded with the respective times at regular intervals until the tank temperature reached the expected maximum on-orbit tank temperature of 30° C. This process was repeated 6 times with the tank empty, and with different levels of water in the tank ranging from full to 20% full. The mass of water loaded into the tank was recorded each time. During each test, measurements were made of (a) the total mass of the system, (b) the heat input and (c) increments of temperature change per time. The unknown parameters were heat loss and specific heat of the system. FIG. 4 plots the results of several such calibration tests. In FIG. 4, plot 400 represents an empty-tank condition, plot 402 represents a full-tank condition, while plots 420, 440, 460 and 480 represent 20%, 40%, 60% and 80% full, respectively. Note that the product of mass times specific heat of the system, represented by the slopes of the various plots of FIG. 4, depends upon the mass of the system, including the mass of liquid in the tank. When that product is plotted against mass, as shown in FIG. 5, that plot is a line described by $$m = 2.1808 \, (10^{-4}) \, mC_p + 3.7388 \tag{14}$$

wherein the constants are for the above-mentioned 12-inch tank system. With the system calibrated, and an unknown amount of liquid in the tank, measurements of temperature rise in response to heat energy yield data from which the mass of the unknown liquid can be calculated. As an example, the above-mentioned 12-inch tank system, filled with an unknown (UNK) amount of water, was heated. A plot of heat energy $Q\Delta t$ vs $\Delta T$ resulting from the data taken in the test is illustrated in FIG. 6. The slope, $mC_p$ is readily established from the measured data to be $1.8845(10^4)$J/°C. Substitution of this value into equation (14) as variable "$mC_p$" yields the system mass "m" of 7.849 kg. Subtracting the tank mass of 4.15 kg yielded a calculated mass of water equal to 3.7 kg. This value was found to be within one gram of the actual mass of water, for an accuracy of $\pm 0.05\%$ in this particular test.

While 28 thermocouples spaced about the tank were used to measure the temperature in the above-described test, conditions of a satellite in orbit are different from those on Earth, so fewer thermocouples need be used. A large number of thermocouples are used for the test on Earth because the liquid pools at the bottom of the tank due to gravity. Fewer thermocouples are needed for the spacecraft system, because the liquid to be measured, such as propellant, distributes itself throughout the tank, adhering to the exterior of the tank. As a result, the above-mentioned distribution of diametrically disposed thermocouple pair and an equatorially located thermocouple reduces the number of data points required to be measured to assume equal heating across the tank.

As mentioned in conjunction with FIG. 1, spacecraft 150 has four fuel tanks, connected in pairs. Changing the temperature of one tank without changing the temperature of the other tank might cause fuel to flow from one tank to the other. Consequently, either valves must be closed during a test to isolate the tank being tested, or all tanks which are interconnected must be measured at the same time to prevent temperature differences from causing movement of fuel. Where there are multiple interconnected propellant tanks, it is believed that good accuracy may require simultaneous testing of all the tanks, because they are depleted at different rates and so many contain difficult amounts of fuel.

Figure 7:
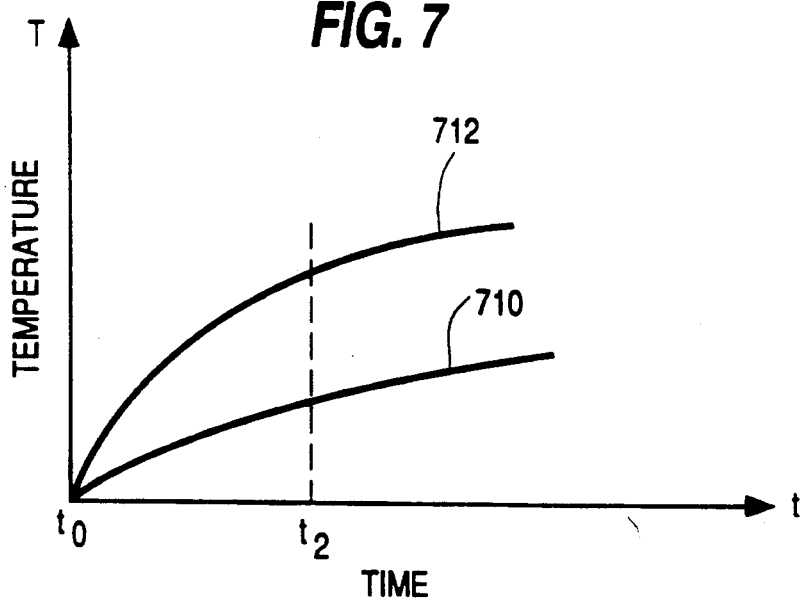
FIG. 7 illustrates plots of temperature versus time measured by sensors on a tank with liquid and gaseous ullage portions during continuous heating.

The tank is not initially in a homogeneous temperature condition, and does not heat uniformly. FIG. 7 illustrates plots of temperature versus time for two temperature sensors on a storage tank, one of which lies over a liquid-filled region, and the other of which lies over an ullage bubble. In FIG. 7, plot 710 represents the temperature sensed by a thermocouple attached to the exterior of the spacecraft propellant tank at a location overlying a liquid portion of the ullage, in response to application of a constant electrical power (constant rate of application of energy) to the heaters beginning at a time $t_0$. Plot 712 represents the temperature sensed by a thermocouple attached to the exterior of the tank at a location overlying a gaseous portion of the ullage, which in the case of the spacecraft embodiment would be the helium bubble. As illustrated by plot 710 in FIG. 7, the liquid heats slowly, and after a time the rise in temperature versus time approximates a straight line. As illustrated by plot 712, the gaseous constituent heats more quickly, but after a time the rate of rise of temperature decreases, and becomes nearly equal to that of the liquid. As illustrated in FIG. 7, the rate of rise or the slope of plot 712 becomes substantially equal to the slope of plot 710 near a time $t_2$. Equality of the slopes is established by, for each time increment, measuring the temperature increment for each temperature sensor, and determining the standard deviation $\sigma$ for the three sensors (when there are three sensors per tank). The slopes are deemed to be equal when the $\sigma$ is 1/10 of the average of the three temperature increments. The interval $t_0$–$t_2$ is deemed to be a "transient" region in which the tank and its contents are not in a stable thermal condition. Temperature measurements are made of regular intervals beginning at time $t_0$ to allow determination of the transient region, but the temperature measurements are, not averaged, for use in determining $C_p$ and $mC_p$ in accordance with the method of the invention, until time $t_2$.

A particular possible application of the above disclosed method relates to a spacecraft which, at the 6th year of life, must have the amount of fuel measured, and an estimate must be provided of the end of life based upon propellant usage, with an accuracy of ±3 months. The initial loading of hydrazine is expected to be 2536.0 pounds mass (lbm), and the expected rate of propellant usage is 4.16 lbm/month. The limitation ±3 months requires that the amount of propellant be determined within ±12.48 lbm out of 2536 lbm, or ±0.49% accuracy. While the above mentioned test yielded a greater accuracy, the expected on-orbit, telemetered accuracy is ±3.56% or ±2.98 months. A technique has been devised to provide the required accuracy using the above-described measurement method.

According to an aspect of the invention, the tank system is calibrated in an empty condition in a vacuum chamber on the ground. The tank is then filled with known mass of propellant, and the spacecraft is launched. Propellant is used according to a predetermined schedule for apogee burn, and a second calibration is performed. A second calibration cannot be performed before apogee burn, because telemetry is not available before that time. Further propellant may be used according to schedule for stationkeeping and attitude control for a predetermined time, as for example for six years. It is believed that the estimation of remaining mass of propellant at this time, based upon a schedule of use, is accurate enough so that no actual prior knowledge of mass consumption is needed. According to the schedule of propellant use, the remaining amount of propellant is estimated at that time to be 348.87 lbm. A measurement is performed, according to the invention, at the six-year point with the spacecraft in orbit. Thus, the required accuracy of the technique is reduced to ±12.48 lbm out of 348.87 lbm, or ±3.58% uncertainty, which appears to be readily achievable.

Other embodiments of the invention will be apparent to those skilled in the art. For example, the method may be applied to the measurement of the mass of any fluid, such as helium, which completely fills a tank. In the context of a spacecraft propulsion system, a monopropellant-only system or a bipropellant-only system may be used, and the described method and apparatus may be used to separately gauge the amounts of fuel and oxidizer in the bipropellant system, or the amount of propellant in the monopropellant system.

What is claimed is:

1. A method for determining the quantity of fluid in a tank, comprising the steps of:
   determining the mass of said tank in an empty condition for calibration;
   generating data representative of the specific heat of said tank, by applying a measured first amount of heat energy to said tank in an empty condition, determining the rise of temperature of said tank in response to said first amount of heat energy, and taking the quotient of said first amount of heat energy divided by the product of said temperature rise multiplied by said mass of said tank to establish a first calibration value;
   placing a known mass of said fluid in said tank to define a second calibration condition;
   generating data representative of the specific heat of said tank and its contents under said second calibration condition, by applying a measured second amount of heat energy to said tank and its contents in said second calibration condition, determining the rise of temperature in response to said second amount of heat energy, and taking the quotient of said second amount of heat energy divided by the product of said temperature rise in response to said second amount of heat energy multiplied by the sum of said mass of said tank plus said known mass of said fluid to establish a second calibration value;

with an unknown mass of said fluid in said tank, applying a third measured amount of heat energy to said tank and its contents;

determining the temperature rise of said tank and its contents in response to said third amount of heat energy to establish a datum value;

one of linearly interpolating and extrapolating said datum value in relation to said first and second calibration values to determine the sum of said unknown mass and said mass of said tank to form an intermediate result; and subtracting said mass of said tank from said intermediate result to determine said unknown mass of said fluid.

2. A method according to claim 1 wherein said fluid comprises a liquid.

3. A method according to claim 2 wherein said step of applying a measured amount of heat energy includes the step of:

applying a measured amount of heat power for a measured period of time.

4. A method according to claim 3 wherein said steps of applying a measured amount of heat power are performed by the further steps of:

applying a known electrical voltage and current to resistance means associated with said tank.

5. A method according to claim 3 wherein said first, second and third amounts of heat power are equal.

6. A method for determining the mass $m_3$ of liquid in a liquid storage tank of a spacecraft, comprising the steps of:

determining the mass $m_1$ of said tank;

before launch of said spacecraft, measuring the temperature rise of said tank and its contents in response to the application of measured amounts of heat energy to said tank and its contents, at least with said tank empty of said liquid and with a known mass $m_2$ of said liquid in said tank, to thereby generate calibration data representative of the specific heat $C_{p1}$ of said tank alone and the specific heat $C_{p2}$ of said tank with said known mass $m_2$ of liquid;

after launch of said spacecraft, applying at least a measured amount of heat energy to said tank and its contents, and measuring the rise in temperature of said tank and its contents in response thereto to establish a product of mass multiplied by specific heat, $m_3C_{p3}$; and determining the mass, $m_3$, of said liquid in said tank by processing said product and said calibration data in the relationship $$m_3 = \frac{m_2(m_3c_{p3} - m_1C_{p1})}{(m_2C_{p2} - m_1C_{p1})}$$

7. A method according to claim 6, wherein said measuring step comprises the steps of:

placing said storage tank, devoid of said liquid, in a test environment to define an empty tank test condition;

under said empty tank test condition, applying measured amounts of heat energy to said storage tank; and measuring the temperature rise of said tank in response to said heat energy under said empty tank test condition, to generate a first portion of said calibration data.

8. A method according to claim 7, wherein said measuring step comprises the further step of:

applying measured amounts of heat energy to said storage tank with said storage tank at least partially filled with said known amount of said liquid; and measuring the temperature rise, in response to said measured amounts of heat energy, of said storage tank at least partially filled with said known amount of liquid, to produce a second portion of said calibration data.

9. A method for measuring the amount of liquid in a liquid storage tank of a spacecraft, said storage tank being at least approximately spherical and including a pressurizing inlet and liquid outlet centered in top and bottom hemispheres defining an equator, said method comprising the steps of performing a first part of a first calibration of one of said storage tank and a simulation thereof in an empty condition devoid of liquid, said first part of said first calibration comprising the step of applying a first measured amount of heat energy to said one of said empty storage tank and said simulation in an evacuated test environment;

performing a second part of said first calibration by measuring the temperature of said one of said storage tank and said simulation thereof in response to said first measured amount of heat energy, at a minimum of first, second and third locations about said one of said tank and said simulation thereof, said third location being on or near said equator, and said first and second locations being on said top and bottom hemispheres, respectively, equally spaced from said equator, and averaging together the results of said measurements at said first, second and third locations, to establish the temperature characteristics of said one of said storage tank and said simulation thereof in said empty condition to thereby establish first calibration data;

performing a third part of said first calibration by measuring the mass of said one of said storage tank and said simulation;

performing a first part of a second calibration of said storage tank in a condition at least partially filled with a known mass $m_2$ of a liquid, said first part of said second calibration comprising the step of applying a second measured amount of heat energy to said storage tank and its liquid contents in an evacuated environment;

performing a second part of said second calibration by measuring the temperature of said storage tank in response to said second measured amount of heat energy at said minimum of said first, second and third locations, and averaging together the results of said measurements at said first, second and third locations, to establish the temperature characteristics of said storage tank filled with a known amount of said liquid, to thereby establish second calibration data;

during operation of said satellite, performing a first step in determining the amount of liquid in said storage tank, including applying a third measured amount of heat energy to said storage tank and its contents;

during operation of said satellite, performing a second step in determining the amount of liquid in said storage tank, including measuring the temperature of said storage tanks in response to said third measured amount of energy at said minimum of said first, second and third locations, and averaging together the results of said measurements at said first, second and third locations, to thereby establish measured data; and processing said measured data together with said first and second calibration data to determine the amount of said liquid in said tank.

10. A method according to claim 9 wherein each of said steps of applying a measured amount of heat energy comprises the step of applying a measured amount of electrical voltage and current to resistance heaters.

11. A method according to claim 10 wherein said measured amount of energy is applied over a period of time encompassing at least some of said steps of measuring the temperature.

12. A method according to claim 9, wherein said step of processing said measured data comprises solving the equation $$m_3 = \frac{m_2[(m_3 c_{p3} - m_1 C_{p1})]}{[(m_2 C_{p2} - m_1 C_{p1})]}$$

where $m_3$ is the unknown mass of liquid being measured;

$m_2$ is the mass of said storage tank and its contents as determined during said second calibration;

$m_1$ is the mass of said one of said storage tank and said simulation;

$C_{p3}$ is the specific heat of the storage tank plus its contents to be measured during spacecraft operation;

$C_{p2}$ is the specific heat of said storage tank filled with a known amount of said liquid during said second calibration; and $C_{p1}$ is the specific heat of said one of said storage tank and its simulation in an empty condition during said first calibration.

13. A method according to claim 9 wherein said step of performing a second part of said first calibration includes the step of selecting said first and second locations, at which said measurements of temperature are made, to be diametrically opposed on said approximately spherical tank.

* * * * *